(12) United States Patent
Shimizu (10) Patent No.: US 8,170,365 B2
(45) Date of Patent: May 1, 2012

(54) IMAGE PROCESSING DEVICE, IMAGE PROCESSING METHOD, AND COMPUTER READABLE MEDIUM

(75) Inventor: Kosuke Shimizu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 508 days.

(21) Appl. No.: 12/424,114

(22) Filed: Apr. 15, 2009

(65) Prior Publication Data
US 2010/0046854 A1    Feb. 25, 2010

(30) Foreign Application Priority Data
Aug. 22, 2008 (JP) ................................. 2008-214322

(51) Int. Cl.
*G06K 9/40* (2006.01)
(52) U.S. Cl. ........ 382/275; 382/199; 382/261; 382/266; 382/274
(58) Field of Classification Search .................. 382/199, 382/261, 266, 274, 275
See application file for complete search history.

(56) References Cited

U.S. PATENT DOCUMENTS

| | | | | |
|---|---|---|---|---|
| 4,833,722 | A | * | 5/1989 | Morton et al. ............. 382/199 |
| 4,855,943 | A | * | 8/1989 | Lewis ...................... 702/189 |
| 4,868,670 | A | * | 9/1989 | Morton et al. ............. 358/447 |
| 6,125,213 | A |   | 9/2000 | Morimoto |
| 6,295,384 | B1 | * | 9/2001 | Into ....................... 382/275 |
| 6,798,910 | B1 | * | 9/2004 | Wilson ..................... 382/199 |

FOREIGN PATENT DOCUMENTS

| | | |
|---|---|---|
| JP | 3554130 B2 | 8/2004 |
| JP | 2005-064913 A | 3/2005 |
| JP | 2007-311903 A | 11/2007 |
| JP | 2008-092442 A | 4/2008 |
| JP | 2008-099129 A | 4/2008 |

OTHER PUBLICATIONS

Japanese Office Action dated Jan. 10, 2012 for corresponding Japanese patent application No. 2008-214322.

* cited by examiner

*Primary Examiner* — Wesley Tucker
*Assistant Examiner* — Mark Roz
(74) *Attorney, Agent, or Firm* — Sughrue Mion, PLLC (57) ABSTRACT

An image processing device includes, a pixel information output section that reads an image along a predetermined direction and outputs saturation information and lightness information, a dust pixel extraction section that extracts dust pixels that are candidates for pixels expressing dust existing in the predetermined direction, a lightness-changed pixel extraction section that extracts lightness-changed pixels, a correction object pixel extraction section that, from among the dust pixels extracted by the dust pixel extraction section, extracts, as pixels that are objects of correction, dust pixels that have not been extracted as lightness-changed pixels and dust pixels in whose vicinities lightness-changed pixels do not exist, a correction section that corrects both of the information of the pixels, using both of the information of neighboring pixels of the pixels, and an image information output section that outputs image information that includes information expressing pixels corrected by the correction section.

13 Claims, 10 Drawing Sheets

IMAGE PROCESSING DEVICE, IMAGE PROCESSING METHOD, AND COMPUTER READABLE MEDIUM

CROSS-REFERENCE TO RELATED APPLICATION

This application is based on and claims priority under 35 USC 119 from Japanese Patent Application No. 2008-214322 filed Aug. 22, 2008.

BACKGROUND

1. Technical Field

The present invention relates to an image processing device, an image processing method, and a computer readable medium that stores an image processing program.

2. Related Art

In an image reading device that has the function of reading, at a predetermined reading position, a document that is conveyed by a conveyance device, when dust adheres to the document reading position, streaks arise in the read image. Therefore, there are techniques such as sensing and removing dust by reading a background plate before reading a document, detecting and removing dust by second-order derivation, and the like.

SUMMARY

According to an aspect of the invention, there is provided an image processing device including a pixel information output section, a dust pixel extraction section, a lightness-changed pixel extraction section, a correction object pixel extraction section, a correction section, and an image information output section.

The a pixel information output section reads an image along a predetermined direction, and outputs saturation information expressing the degree of saturation of respective pixels of the image and lightness information expressing the lightness of the respective pixels of the image. The dust pixel extraction section, on the basis of the saturation information and the lightness information output by the pixel information output section, extracts dust pixels that are candidates for pixels expressing dust existing in the predetermined direction. The lightness-changed pixel extraction section, on the basis of the lightness information output by the pixel information output section, extracts lightness-changed pixels that express lightness-changed portions. A correction object pixel extraction section, from among the dust pixels extracted by the dust pixel extraction section, extracts, as pixels that are objects of correction, dust pixels that have not been extracted as lightness-changed pixels by the lightness-changed pixel extraction section and dust pixels in whose vicinities lightness-changed pixels extracted by the lightness-changed pixel extraction section do not exist. The correction section corrects saturation information and lightness information of the pixels extracted by the correction object pixel extraction section, using saturation information and lightness information of neighboring pixels of the pixels extracted by the correction object pixel extraction section. The image information output section outputs image information that includes information expressing pixels corrected by the correction section.

BRIEF DESCRIPTION OF THE DRAWINGS

Exemplary embodiment of the present invention will be described in detail based on the following diagrams, wherein.

DETAILED DESCRIPTION

An exemplary embodiment of the present invention will be described in detail hereinafter with reference to the drawings. In the following description, there are cases in which structures are differentiated by using a letter after the reference numeral, such as "4A" or the like. However, letters are omitted when there is no particular need for differentiation. Moreover, in the present exemplary embodiment, the "predetermined direction" when reading an image along a predetermined direction is the scan line direction.

Figure 1:
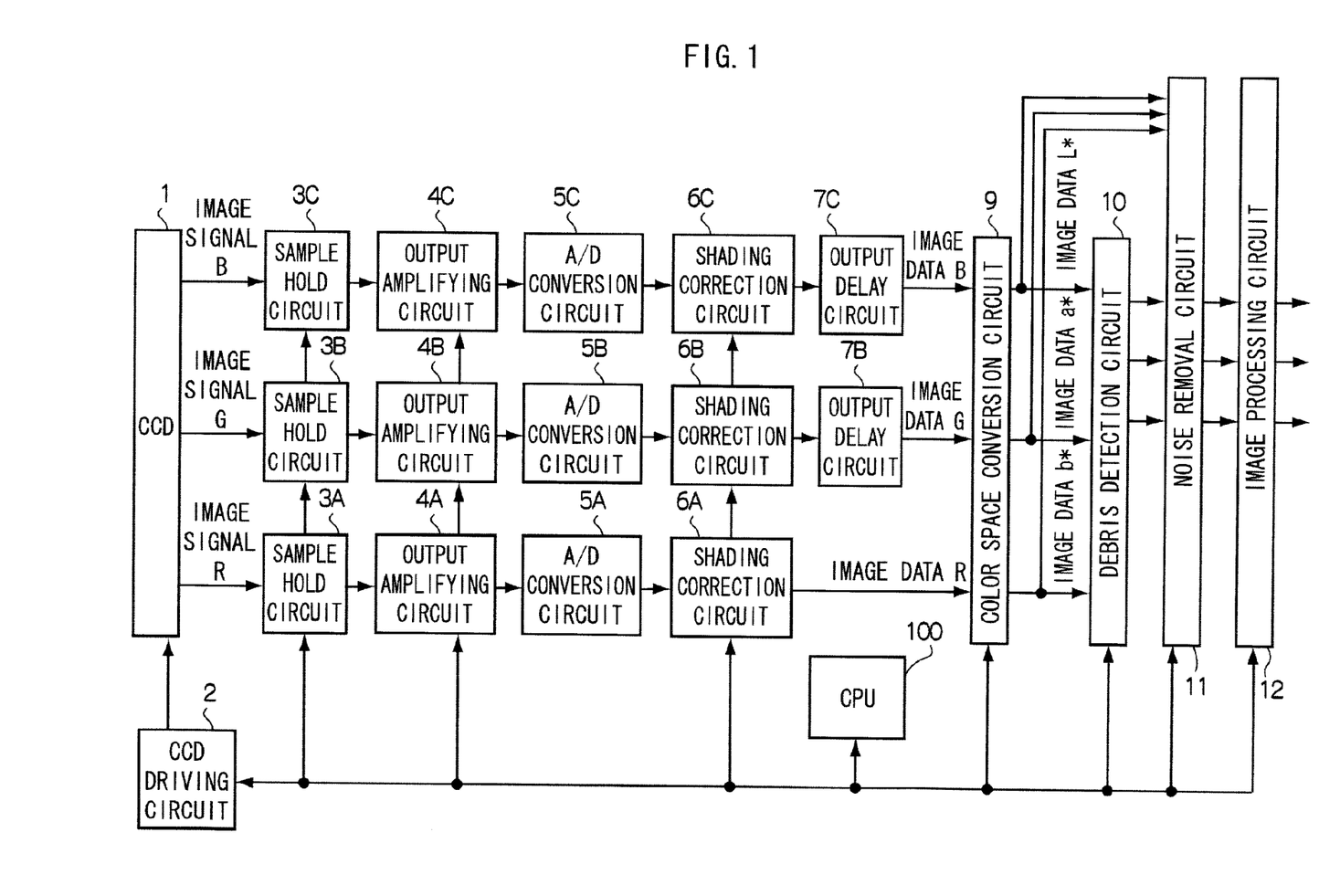
FIG. 1 is a block diagram showing the structure of an image processing device.

FIG. 1 is a block diagram showing the structure of an image processing device according to the exemplary embodiment of the present invention. In this image processing device, detection of noise that is caused by dust is carried out on image data that has been phase-corrected through shading correction. When noise is detected, the noise is removed. The image, from which noise is removed, is subjected to image processing such as enlargement/reduction and the like as needed, and is output from the image processing device.

A CCD 1, a CCD driving circuit 2, sample hold circuits 3A, 3B, 3C, output amplifying circuits 4A, 4B, 4C, A/D conversion circuits 5A, 5B, 5C, shading correction circuits 6A, 6B, 6C, output delay circuits 7B, 7C, a color space conversion circuit 9, a dust detection circuit 10, a noise removal circuit 11, an image processing circuit 12, and a CPU 100 are illustrated in FIG. 1.

Among these, the CPU 100 controls the respective sections of the image processing device. Specifically, the CPU 100 sets the driving cycle of the CCD 1 that is carried out by the CCD driving circuit 2, carries out control of the gains of the output amplifying circuits 4A through 4C, and carries out various types of control of the shading correction circuits 6A through 6C, the dust detection circuit 10, the noise removal circuit 11, the image processing circuit 12, and the like.

At each of reading positions at three places from an upstream-most reading position to a downstream-most reading position on the conveyance path of the document, the CCD 1 reads, in main scan line units, the image on the document that is conveyed by an unillustrated conveyance device, and outputs analog image signals R, G, B that correspond to the densities of the read image. Note that the CCD 1 at this time considers the image on a scan line to be small images of a predetermined size lined-up in a row, and reads the images on the scan lines.

Figure 2:
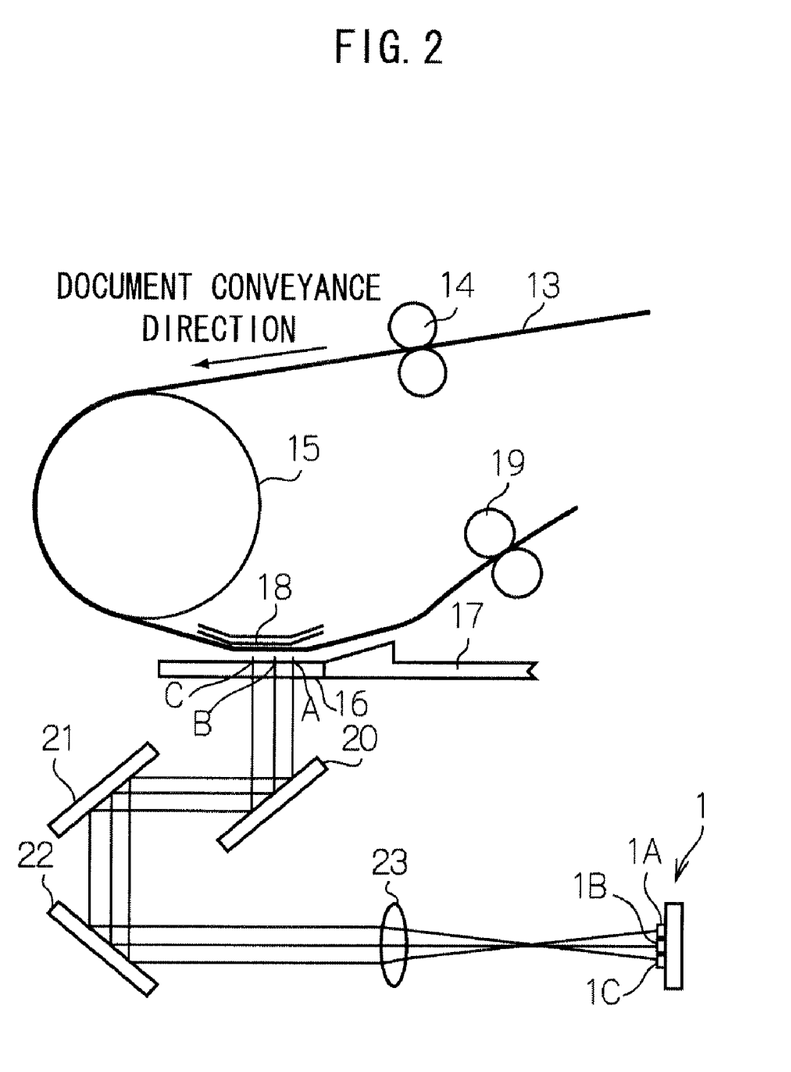
FIG. 2 is a drawing showing the structures of a document conveyance device and an optical system.

FIG. 2 is a drawing showing the structure of a document conveyance device, and the structure of an optical system from the reading positions on the conveyance path of the document to the CCD 1. In FIG. 2, a document 13 is conveyed one-by-one by pull-in rollers 14 to a conveyance roller 15. The conveyance roller 15 changes the document conveyance direction, and conveys the document 13 toward a platen glass 16.

The document 13 that is conveyed in this way follows along a back platen 18, and finally, is discharged from the conveyance device by discharge rollers 19. The aforementioned reading positions at the three places from the upstream-most reading position to the downstream-most reading position are respectively provided on the platen glass 16. Optical paths of the respective document images at these respective reading positions are changed by a first mirror 20, a second mirror 21, a third mirror 22, and the images are reduced by a lens 23, and reach three CCD line sensors 1A, 1B, 1C that structure the CCD 1.

The CCD line sensor 1C outputs image signals B that express the densities of the B color components of N pixels that are lined-up on a straight line in a direction (the scan direction) traversing the document conveyance direction, at a reading position C that is at the upstream-most side on the platen glass 16. Further, the CCD line sensor 1B outputs image signals G that express the densities of the G color components of N pixels that are lined-up on a straight line in the scan direction, at a reading position B that is further downstream by a distance of four main scan lines (that will hereinafter simply be called "four lines") from the reading position at the upstream-most side. Moreover, the CCD line sensor 1A outputs image signals R that express the densities of the R color components of N pixels that are lined-up on a straight line in the scan direction on a main scan line, at a downstream-most reading position A that is 4 lines downstream of the reading position that corresponds to the image signals G.

Explanation again returns to FIG. 1. At the stage after the CCD 1, there are provided: a signal processing system A that includes the sample hold circuit 3A, the output amplifying circuit 4A, the A/D conversion circuit 5A and the shading correction circuit 6A; a signal processing system B that includes the sample hold circuit 3B, the output amplifying circuit 4B, the A/D conversion circuit 5B and the shading correction circuit 6B; and a signal processing system C that includes the sample hold circuit 3C, the output amplifying circuit 4C, the A/D conversion circuit 5C and the shading correction circuit 6C. The signal processing systems A through C are signal processing systems that correspond respectively to the image signals R, the image signals G and the image signals B that are obtained at the reading positions A, B, C, respectively.

Here, the analog image signals R, G, B that are obtained from the CCD 1 are respectively sampled by the sample hold circuits 3, and thereafter, are amplified to respective appropriate levels by the output amplifying circuits 4, and are converted into digital image data R, G, B respectively by the A/D conversion circuits 5. The shading correction circuits 6 carry out, on these digital image data R, G, B, correction corresponding to the sensitivity dispersion of the CCD line sensors 1 and the light amount distribution characteristic of the optical system. In this way, digital image data that include the densities of the respective pixels expressing the document image are obtained.

The output delay circuits 7B, 7C delay the image data G, B, that are output from the shading correction circuits 6B, 6C, by delay times of four lines and eight lines, respectively, and output them as image data of the same phase as the image data R.

The color space conversion circuit 9 carries out gamma correction and conversion to the L*a*b* color space on the image data R that is output from the shading correction circuit 6A and on the image data G, B that are output from the output delay circuits 7B, 7C. In the following explanation, L*, a*, b* will be expressed as L, a, b, respectively, with the asterisks omitted. Namely, the saturations and lightnesses of pixels corresponding to respective small images are output to the dust detection circuit 10.

Figure 3A:
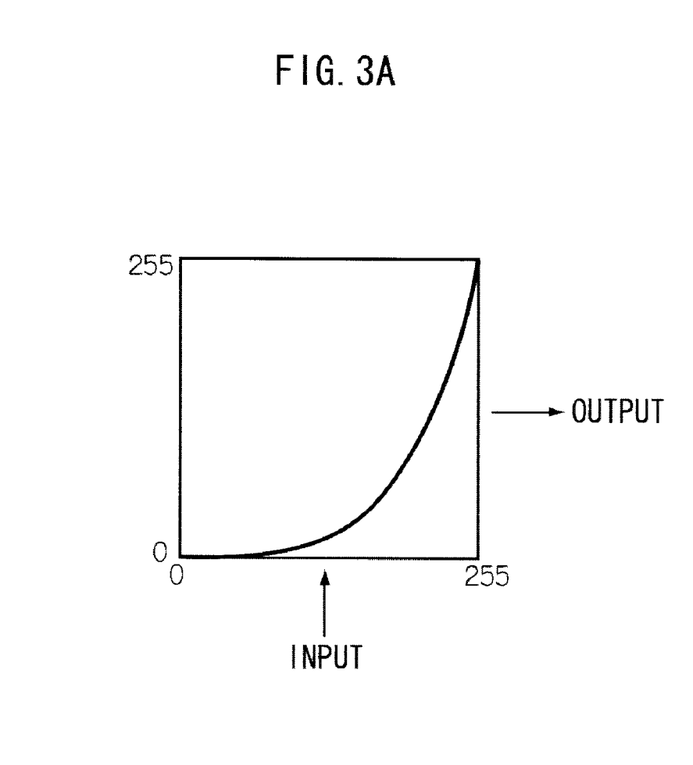
FIG. 3A and FIG. 3B are a drawing showing an input/output characteristic and matrix operation in gamma correction, respectively.

FIG. 3A is a drawing showing the input/output characteristic in the gamma correction. The input value of the density is shown on the horizontal axis, and the output value of the density is shown on the vertical axis. The density is expressed by 256 gradations, and the density becomes deeper from 0 toward 255. As shown in FIG. 3A, in the gamma correction in the present exemplary embodiment, the input/output characteristic draws a downwardly-convex curve. Namely, the density is corrected such that, the higher the density, the greater the contrast becomes.

Figure 3B:
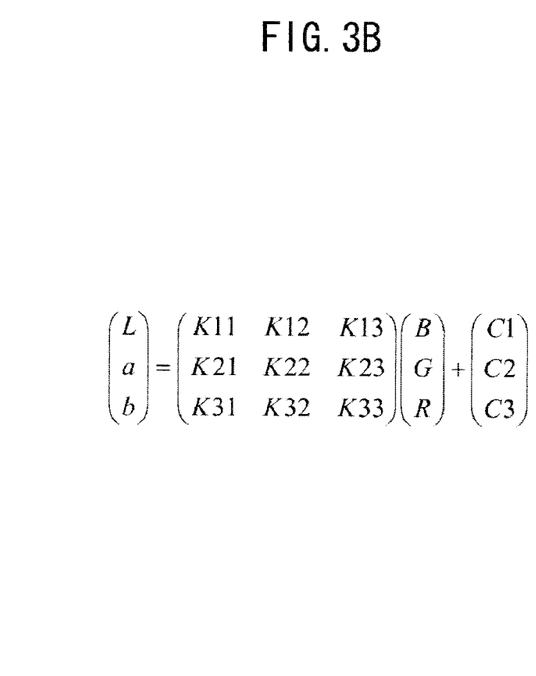

Further, in the conversion to the Lab color space, the densities of the respective colors after the gamma correction are converted, by matrix operation such as shown in FIG. 3B for example, into L, a, b that are the three components in the Lab color space, and are output to the dust detection circuit 10.

On the basis of the saturations and the lightnesses output from the color space conversion circuit 9, the dust detection circuit 10 extracts dust pixels that are candidates for pixels expressing dust that exists in the scan line direction. On the basis of the lightnesses output from the color space conversion circuit 9, the dust detection circuit 10 extracts lightness-changed pixels that express lightness-changed portions, on the basis of the lightness information. In the following description, a lightness-changed portion is called an edge portion, and a lightness-changed pixel is called an edge pixel.

Further, the dust detection circuit 10 extracts, from among the extracted dust pixels and as pixels that are objects of correction, the dust pixels that have not been extracted as edge pixels and the dust pixels in whose vicinities extracted edge pixels do not exist.

Figure 4:
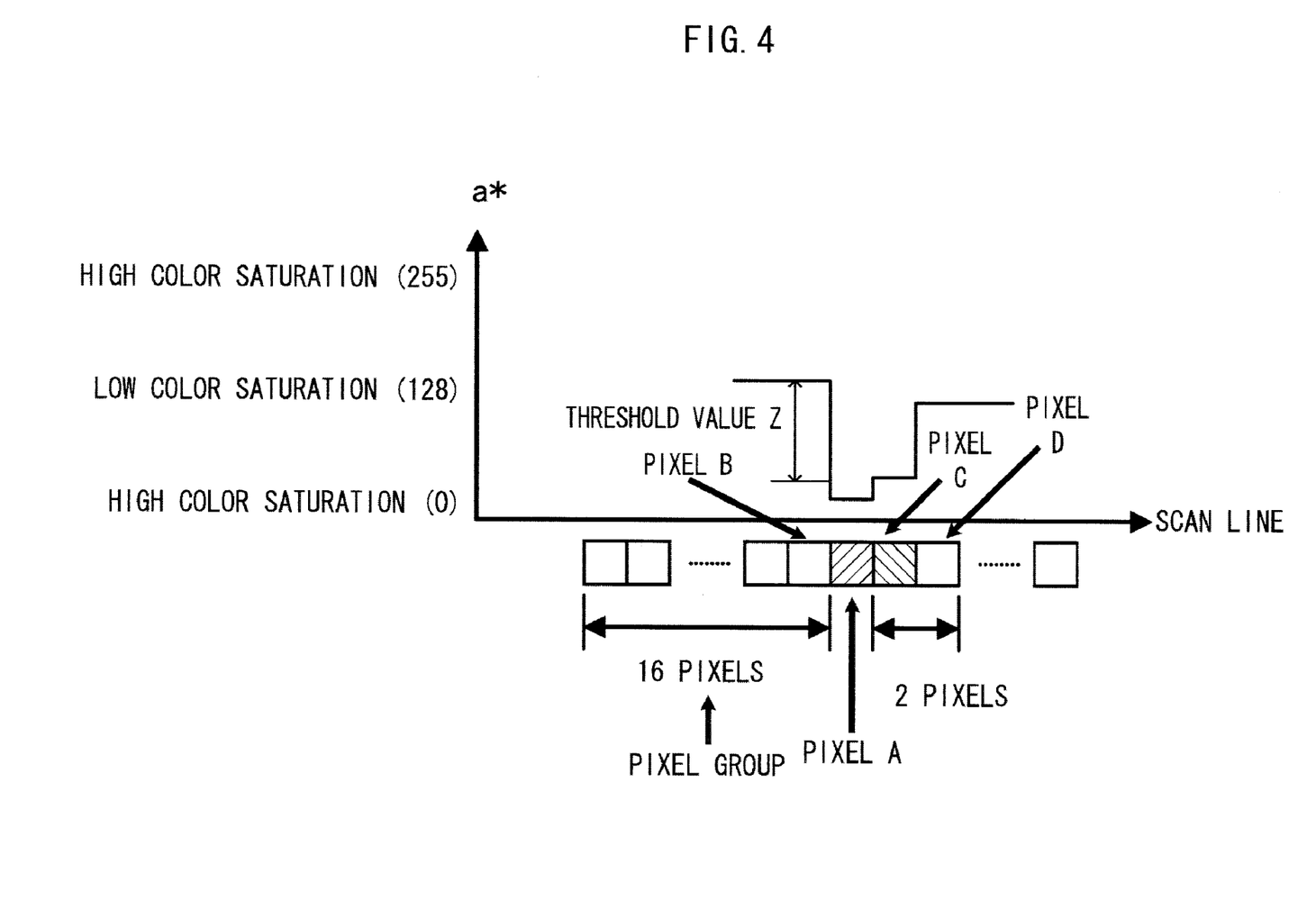
FIG. 4 is a graph showing saturation when dust exists on a scan line.

Here, the algorithm by which the dust detection circuit 10 extracts the dust pixels will be explained. FIG. 4 shows saturation when dust exists on a scan line, by using a graph in which saturation is plotted on the vertical axis ("a" is used in FIG. 4), and the positions of pixels that are lined-up in a row on a scan line are shown on the horizontal axis.

First, on the basis of the saturation information and the lightness information, the dust detection circuit 10 extracts dust pixels that are candidates of pixels expressing dust that exist on that scan line.

Concretely, to explain with reference to FIG. 4, for each pixel, the dust detection circuit 10 judges whether or not that pixel (pixel A) has a saturation that is separated by greater than or equal to a threshold value (threshold value Z) from a first value that is determined from the respective saturations of a first pixel group (pixel group) that includes pixels of a first predetermined number (16 pixels) that are continuous from one pixel (pixel B) among the two pixels (the small images corresponding to pixels B, C) that are adjacent to that pixel (pixel A). A pixel for which this judgment is affirmative is extracted as a first pixel.

Due thereto, pixel A is extracted in FIG. 4. Further, the first value is, for example, the average value of the saturations of the respective pixels belonging to the pixel group.

The aforementioned first predetermined number is 16 pixels in the present exemplary embodiment, but is not limited to this number of pixels, and may be determined appropriately in accordance with the image characteristics (the presence/absence of thin lines), resolution, and size of dust. Further, the threshold value Z as well may be determined appropriately in accordance with the resolution and the size of the dust.

Next, the dust detection circuit 10 extracts, from among the pixels that continue from the other pixel (pixel C) that is adjacent to the extracted pixel (pixel A), a second pixel that has a saturation separated from the first value by greater than or equal to the threshold value Z and that is nearest to the position of the first pixel (pixel A). Due thereto, pixel D in FIG. 4 is extracted.

Further, when the number of intermediate pixels (pixel C) that are pixels existing between the first pixel (pixel A) and the second pixel (pixel D) is less than or equal to a second predetermined number (one pixel), the dust detection circuit 10 extracts the first pixel (pixel A) and the intermediate pixel (pixel C) as saturation-changed pixels.

Here, the second predetermined number is one pixel in the exemplary embodiment, but the second predetermined number is not limited to this number and is determined in accordance with the size of the dust. This is because, if the dust is large, the number of pixels expressing the dust increases. Conversely, if the dust is small, the number of pixels expressing the dust decreases.

Further, when the lightnesses of the extracted saturation-changed pixels (pixels A, C) are lightnesses that are not dark as compared with the lightness of the one pixel (pixel B) of the two adjacent pixels and the lightness of the second pixel (pixel D), the dust detection circuit 10 extracts the saturation-changed pixels as dust pixels.

In this case, the pixels A, C are extracted as dust pixels. Note that "lightness that is not dark" will be described by using the graph shown in FIG. 5.

Figure 5:
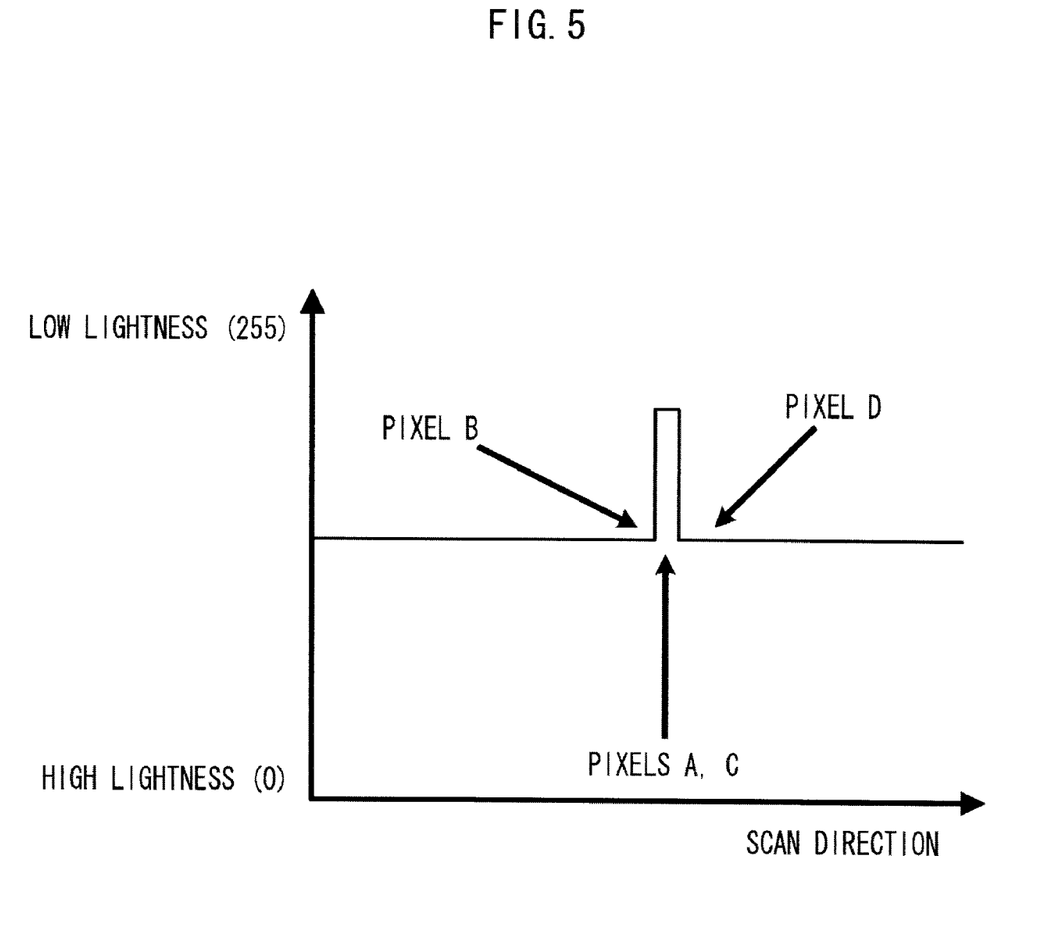
FIG. 5 illustrates lightness when there exist pixels at which the lightness becomes low.

FIG. 5 is a graph showing lightness on the vertical axis, and, on the horizontal axis, the positions of the pixels that are lined-up in a row on the scan line. FIG. 5 shows lightness when there exist pixels whose lightnesses become low. Further, the graph shown in FIG. 5 is a graph when lightness is dark as compared with the lightness of one pixel among the two adjacent pixels, and as compared with the lightness of the second pixel. Namely, not dark but light is lightness when the graph does not become an upwardly-convex graph. If it does not become this graph, it is extracted as a dust pixel. This is because, usually, it is often the case that the dust is paper powder, and in this case, the lightness does not become darker than the vicinity. Therefore, when a pixel is not dark and is not light, the possibility that it is dust is low.

When dust is sensed by extracting dust pixels in this way, next, the dust detection circuit 10 extracts edge pixels that are candidates for pixels that express an edge portion of the image on the scan line.

Figure 6:
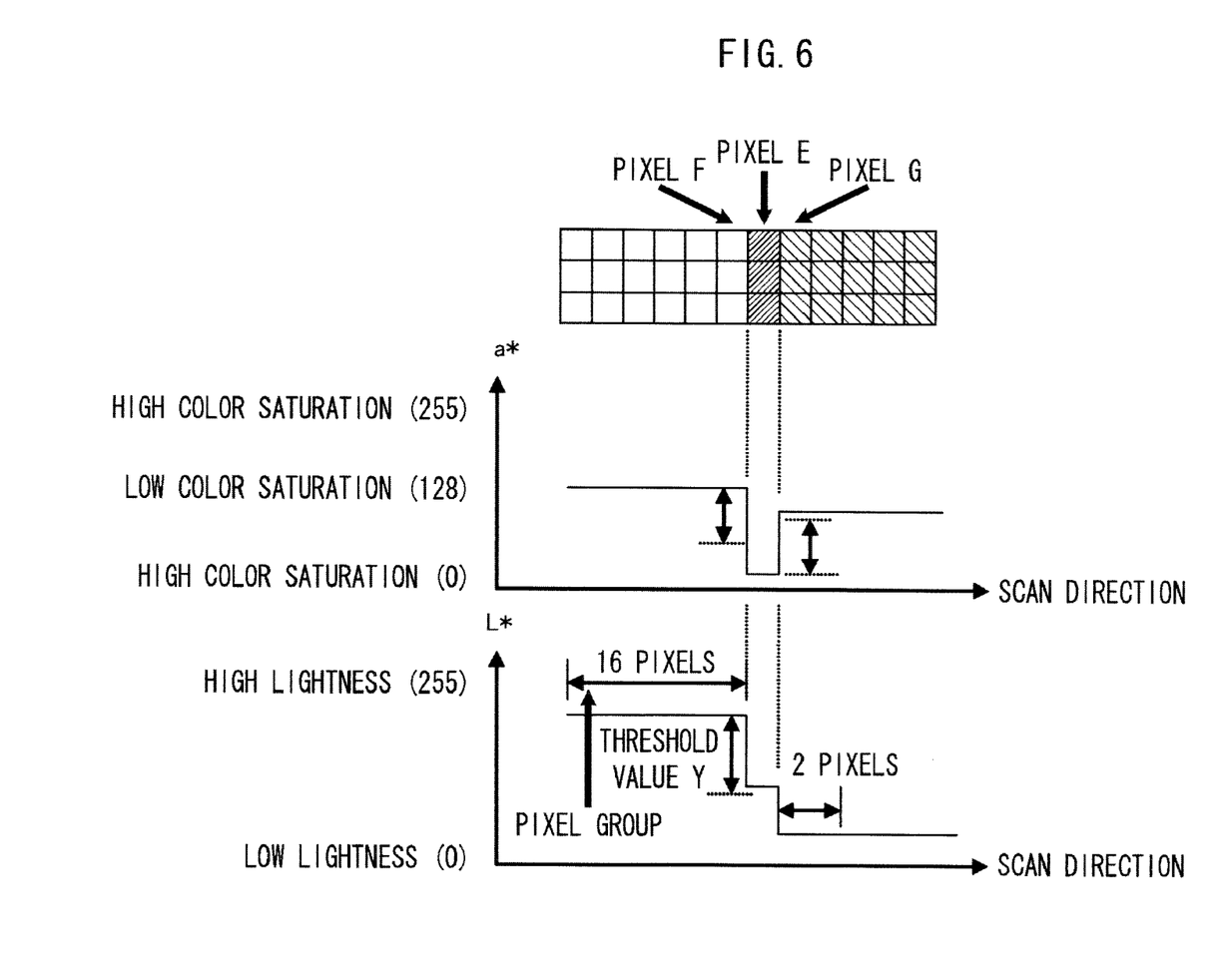
FIG. 6 is graphs showing saturation and lightness of an edge portion.

Concrete explanation will be given by using FIG. 6. Shown in FIG. 6 are an example of an image corresponding to an edge portion, and therebelow, two graphs that are a graph in which saturation is plotted on the vertical axis and a graph in which lightness is plotted on the vertical axis. The horizontal axis in both cases shows the positions of the pixels that are lined-up in a row on the scan line. As shown in FIG. 6, in judging whether a portion is or is not an edge portion, it is necessary to take the lightness into consideration.

For each pixel, the dust detection circuit 10 judges whether or not that pixel (pixel E) is a pixel having a lightness that is separated by greater than or equal to a threshold value Y from a second value that is determined from the respective lightnesses of a second pixel group that includes pixels of a third predetermined number (16 pixels) that are continuous from one pixel (pixel F) among the two pixels (pixels F, G) that are adjacent to that pixel (pixel E). A pixel for which this judgment is affirmative is extracted as a third pixel.

Due thereto, pixel E is extracted in FIG. 6. Further, the third value is, for example, the average value of the lightnesses of the respective pixels belonging to the pixel group. Note that this average value is determined in order to eliminate the effects of noise. Therefore, rather than a third predetermined number of pixels that are continuous from pixel F as described above, pixels of a third predetermined number that are every other pixel continuing from pixel F may be used, and the average value of these pixels may be used.

The aforementioned third predetermined number is 16 pixels in the present exemplary embodiment, but is not limited to this number of pixels, and may be determined appropriately in accordance with the resolution and the size of the dust. Further, the threshold value Y as well may be determined appropriately in accordance with the resolution and the size of the dust.

Moreover, the dust detection circuit 10 extracts a third pixel as an edge pixel, when there continues, from the other pixel (pixel G) adjacent to the third pixel (pixel E), a number of pixels whose lightness is separated by greater than or equal to a threshold value from the third value, which number (two pixels or more) is greater than the second predetermined number (one pixel). In FIG. 6, pixel E that is a third pixel is extracted as an edge pixel.

Then, from among the extracted dust pixels, the dust detection circuit 10 extracts, as pixels that are objects of correction, the dust pixels that have not been extracted as edge pixels and the dust pixels in whose vicinities extracted edge pixels do not exist.

Figure 7:
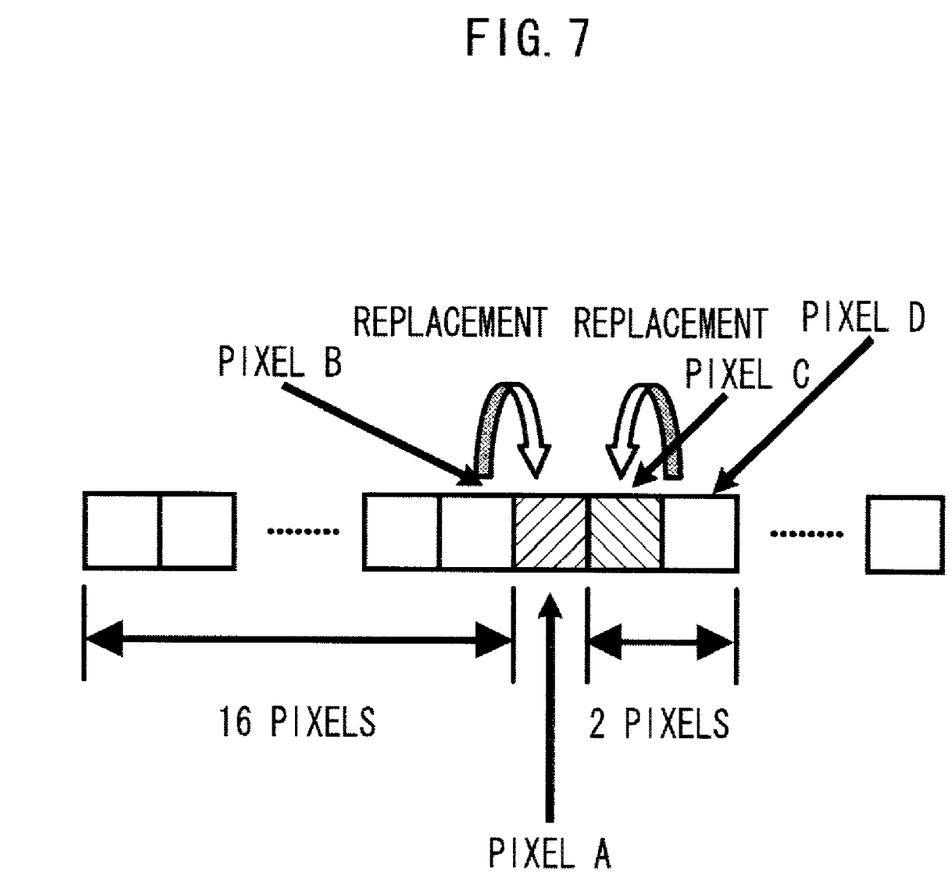
FIG. 7 is a drawing showing the correction of saturation and lightness of pixels that are objects of correction.

The noise removal circuit 11 corrects the saturation information and the lightness information of the pixels that are extracted as the correction object pixels, by using the saturation information and the lightness information of the neighboring pixels of these pixels. Specifically, as shown in FIG. 7, the noise removal circuit 11 corrects the saturation information and the lightness information of the correction object pixels (pixels A, C) by using the saturation information and the lightness information of the neighboring pixels (pixels B, D) of these pixels. In FIG. 7, correction is carried out by replacing the lightness information and the saturation information of pixel A with the lightness information and the saturation information of pixel B, and by replacing the lightness information and the saturation information of pixel C with the lightness information and the saturation information of pixel D.

Image information, that includes the information expressing the pixels corrected in this way, is output from the noise removal circuit 11. After this image information is subjected to image processing such as enlargement or reduction and the like by the image processing circuit, the image information is output.

Figure 8:
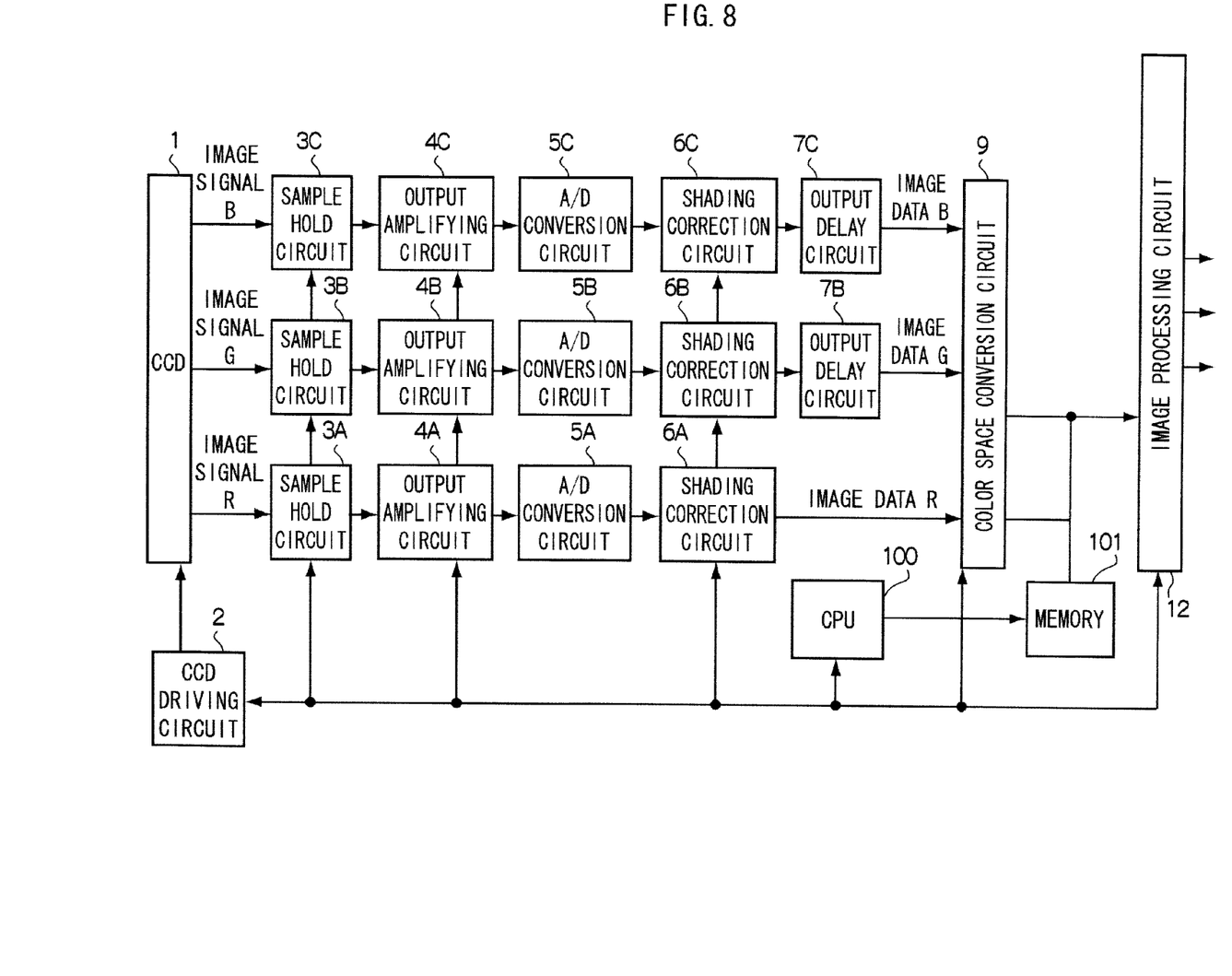
FIG. 8 is a drawing showing the structure that is realized by software.

The above-described contents are based on the structure of FIG. 1, but the dust detection/noise removal functions that are executed at the dust detection circuit 10 and the noise removal circuit 11 can be realized by software. In a structure of realizing these functions by software, as shown in FIG. 8, the dust detection circuit 10 and the noise removal circuit 11 are removed from the structure, the image information output from the color space conversion circuit 9 is stored once in a memory 101, and dust detection/noise removal processing are carried out on the stored image information in accordance with a program by the CPU 100. When the execution of the dust detection/noise removal processing is finished, the image information, that has been subjected to the dust detection/noise removal processing and is stored in the memory 101, is subjected to image processing such as enlargement or reduction and the like by the image processing circuit 12, and thereafter, is output.

Figure 9:
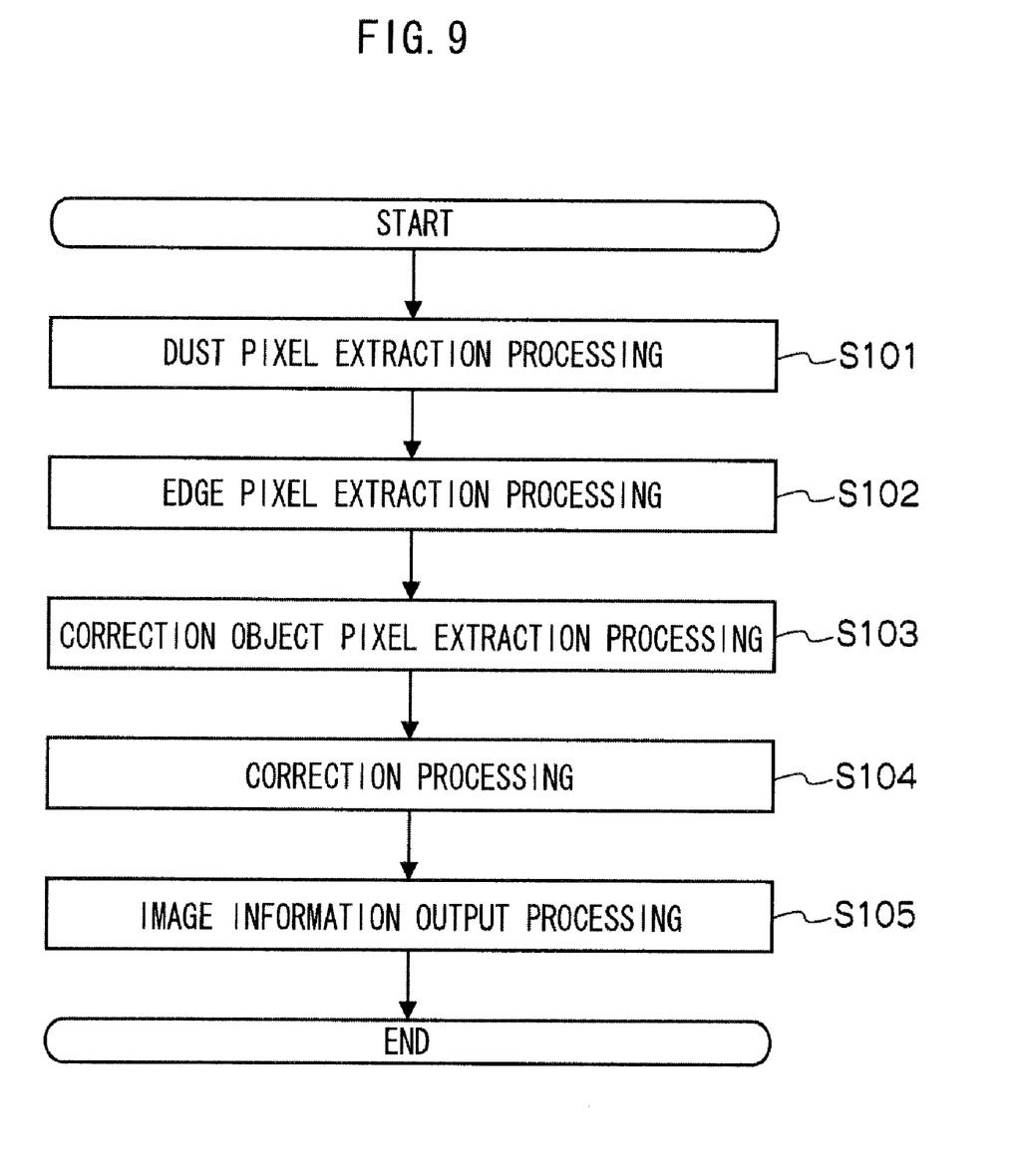
FIG. 9 is a flowchart showing the flow of image processing relating to the present exemplary embodiment.

FIG. 9 shows a flowchart showing the flow of processing by an image processing program when the functions are realized by software. This processing is executed by the CPU 100. First, in step 101, on the basis of the saturation information and the lightness information that are output from the color space conversion circuit 9 that outputs saturation information expressing the degree of saturation of an image and lightness information expressing the lightness due to the image being read along a predetermined direction, dust pixel extraction processing is carried out that extracts dust pixels that are candidates for pixels expressing dust that exist in the aforementioned predetermined direction.

In step 102, on the basis of the lightness information output from the color space conversion circuit 9, edge pixel extraction processing is carried out that extracts lightness-changed pixels that express lightness-changed portions.

In step 103, correction object pixel extraction processing is carried out that, from among the dust pixels extracted by the dust pixel extraction processing, extracts, as pixels that are objects of correction, the dust pixels that have not been extracted as edge pixels by the edge pixel extraction processing and the dust pixels in whose vicinities extracted edge pixels do not exist.

In step 104, correction processing is carried out that corrects the saturation information and lightness information of the pixels extracted in the correction object pixel extraction processing, by using the saturation information and the lightness information of the neighboring pixels of these pixels.

In step 105, image information output processing is carried out that outputs image information, that includes information expressing the pixels corrected by the correction processing, and processing ends.

Note that this software can be provided to an image processing device in a state of being recorded on a recording medium such as a magnetic tape, a magnetic disk, a Floppy™ disk, an optical recording medium, a magneto-optical recording medium, a CD (Compact Disk)-ROM, a DVD (Digital Versatile Disk)-RAM, or the like. Further, the software can be provided to an image processing device via a network such as the internet or the like.

The flow of processing of the above-described flowchart is an example. It goes without saying that the order of the processing can be changed, new steps can be added, and unnecessary steps can be deleted within a scope that does not deviate from the gist of the exemplary embodiment of the invention.

Figure 10:
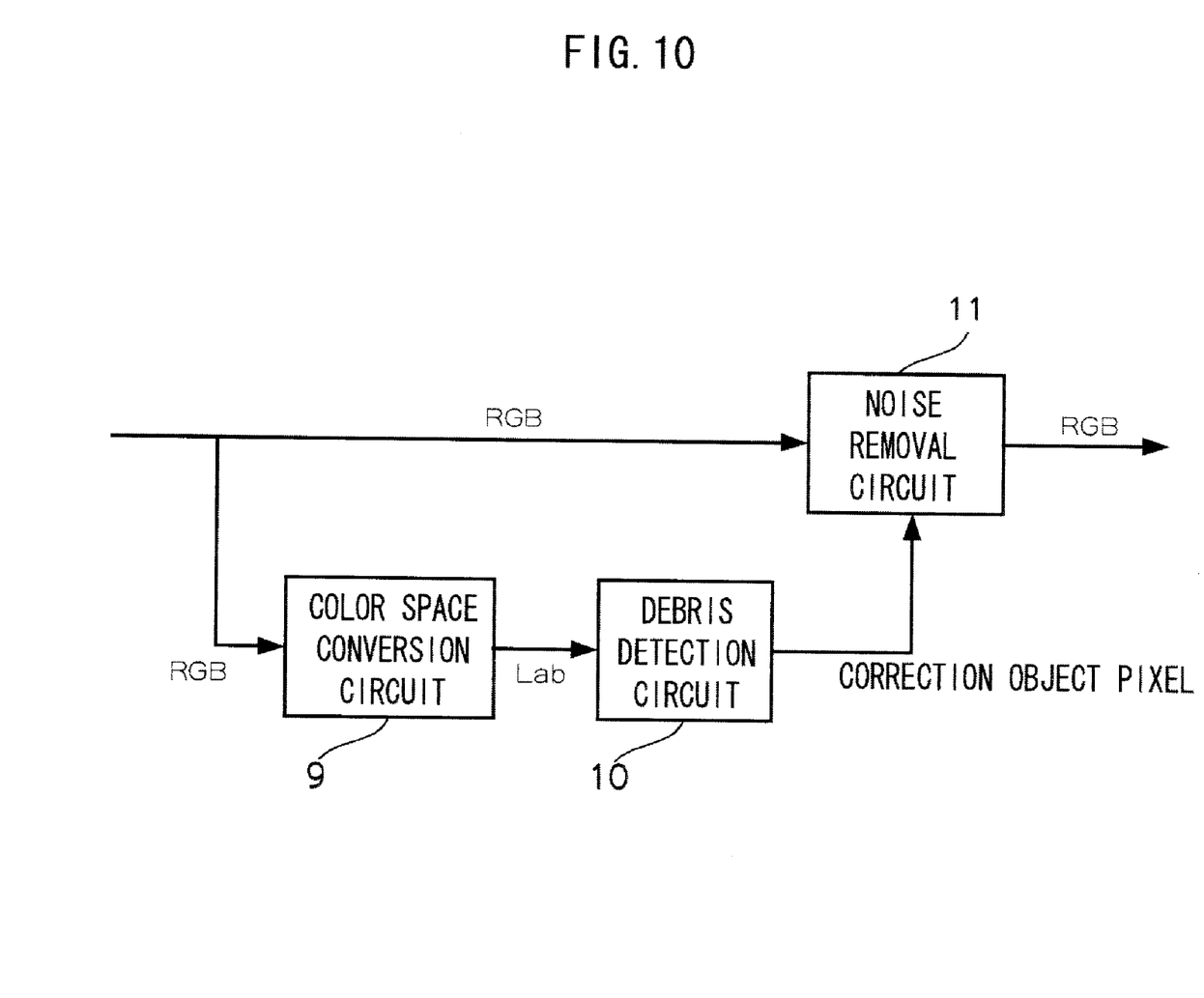
FIG. 10 is a drawing showing a structure when noise removal is carried out in the RGB space.

Further, in the above explanation, the image information is output as Lab. However, as shown in FIG. 10, the image information can be output in the RGB space. The RGB signals that are output from the output delay circuits 7B, 7C and the shading correction circuit 6A are output to both the noise removal circuit 11 and the color space conversion circuit 9. By the above-described processing, the color space conversion circuit 9 converts the signals into Lab, and the dust detection circuit 10 outputs the correction object pixels to the noise removal circuit. Due thereto, the noise removal circuit 11 removes the noise in the image information that is expressed by the RGB signals, and output in RGB is thereby possible.

Moreover, another color space by which lightness and saturation (or equivalents thereof) can be obtained may be used without converting to Lab.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
a pixel information output section that reads an image along a predetermined direction, and outputs saturation information expressing the degree of saturation of respective pixels of the image and lightness information expressing the lightness of the respective pixels of the image;
a dust pixel extraction section that, on the basis of the saturation information and the lightness information output by the pixel information output section, extracts dust pixels that are candidates for pixels expressing dust existing in the predetermined direction;
a lightness-changed pixel extraction section that, on the basis of the lightness information output by the pixel information output section, extracts lightness-changed pixels that express lightness-changed portions;
a correction object pixel extraction section that, from among the dust pixels extracted by the dust pixel extraction section, extracts, as pixels that are objects of correction, dust pixels that have not been extracted as lightness-changed pixels by the lightness-changed pixel extraction section and dust pixels in whose vicinities lightness-changed pixels extracted by the lightness-changed pixel extraction section do not exist;
a correction section that corrects saturation information and lightness information of the pixels extracted by the correction object pixel extraction section, using saturation information and lightness information of neighboring pixels of the pixels extracted by the correction object pixel extraction section; and
an image information output section that outputs image information that includes information expressing pixels corrected by the correction section;
wherein the dust pixel extraction section comprises:
a first pixel extraction section that, for each of the pixels, compares the saturation of a pixel and a first value, which is determined from respective saturations of a first pixel group that includes pixels aligned sequentially from one of two pixels that are adjacent to the pixel up to a first predetermined number thereof, determines whether or not the saturation of the pixel is separated from the first value by greater than or equal to a threshold value, and extracts the pixel as a first pixel when the determination is affirmative;
a second pixel extraction section that extracts, from among pixels aligned sequentially from a pixel that is adjacent to the first pixel extracted by the first pixel extraction section, a second pixel that has a saturation which is not separated from the first value by greater than or equal to a threshold value and that is positioned nearest to the first pixel; and a saturation-changed pixel extraction section that, when a number of intermediate pixels existing between the first pixel and the second pixel is less than or equal to a second predetermined number, extracts the first pixel and the intermediate pixels as saturation-changed pixels, wherein, when the lightness of a saturation-changed pixel, which is extracted by the saturation-changed pixel extraction section, is not darker than the lightness of one of two adjacent pixels and the lightness of the second pixel, the saturation-changed pixel is extracted as a dust pixel.

2. The image processing device according to claim 1, wherein the lightness-changed pixel extraction section:

comprises a third pixel extraction section that, for each of the pixels, compares the lightness of a pixel and a second value, which is determined from respective lightness values of a second pixel group that includes pixels aligned sequentially from one of two pixels that are adjacent to the pixel up to a third predetermined number thereof, determines whether or not lightness of the said pixel is separated from the second value by greater than or equal to a threshold value, and extracts the pixel as a third pixel when the determination is affirmative; and extracts the third pixel as a lightness-changed pixel when pixels, respectively having lightness values separated from the second value by greater than or equal to the threshold value, are aligned sequentially from a pixel that is adjacent to the third pixel extracted by the third pixel extraction section to a number thereof that is greater than the second predetermined number.

3. The image processing device according to claim 2, wherein the first value is an average value of respective saturations of the pixels belonging to the first pixel group.

4. The image processing device according to claim 2, wherein the second value is an average value of respective lightness values of the pixels belonging to the second pixel group.

5. The image processing device according to claim 3, wherein the second value is an average value of respective lightness values of the pixels belonging to the second pixel group.

6. The image processing device according to claim 1, wherein the second predetermined number is determined in accordance with dust size.

7. The image processing device according to claim 2, wherein the second predetermined number is determined in accordance with dust size.

8. The image processing device according to claim 3, wherein the second predetermined number is determined in accordance with dust size.

9. The image processing device according to claim 4, wherein the second predetermined number is determined in accordance with dust size.

10. The image processing device according to claim 5, wherein the second predetermined number is determined in accordance with dust size.

11. An image processing method comprising:

reading an image along a predetermined direction, and outputting saturation information showing the degree of saturation of respective pixels of the image and lightness information showing the lightness of the respective pixels of the image;

on the basis of the output saturation information and lightness information, extracting dust pixels that are candidates for pixels showing dust existing in the predetermined direction;

on the basis of the output lightness information, extracting lightness-changed pixels that show lightness-changed portions;

from among the extracted dust pixels, extracting, as pixels that are objects of correction, dust pixels that have not been extracted as lightness-changed pixels and dust pixels in whose vicinities extracted lightness-changed pixels do not exist;

correcting saturation information and lightness information of the extracted pixels by using saturation information and lightness information of neighboring pixels of the extracted pixels; and outputting image information that includes information expressing the corrected pixels;

wherein said extracting dust pixels comprises:

comparing the saturation of a pixel and a first value, Which is determined from respective saturations of a first pixel group that includes pixels aligned sequentially from one of two pixels that are adjacent to the pixel up to a first predetermined number thereof, determining whether or not the saturation of the pixel is separated from the first value by greater than or equal to a threshold value, and extracting the pixel as a first pixel when the determination is affirmative;

extracting, from among pixels aligned sequentially from a pixel that is adjacent to the first pixel, a second pixel that has a saturation which is not separated from the first value by greater than or equal to a threshold value and that is positioned nearest to the first pixel; and extracting the first pixel and the intermediate pixels as saturation-changed pixels when a number of intermediate pixels existing between the first pixel and the second pixel is less than or equal to a second predetermined number, wherein, when the lightness of a saturation-changed pixel, which is extracted by the saturation-changed pixel extraction, is not darker than the lightness of one of two adjacent pixels and the lightness of the second pixel, the saturation-changed pixel is extracted as a dust pixel.

12. A computer readable medium storing a program causing a computer to execute a process for image processing, the process comprising:

reading an image along a predetermined direction, and outputting saturation information showing the degree of saturation of respective pixels of the image and lightness information showing the lightness of the respective pixels of the image;

on the basis of the output saturation information and lightness information, extracting dust pixels that are candidates for pixels showing dust existing in the predetermined direction;

on the basis of the output lightness information, extracting lightness-changed pixels that show lightness-changed portions;

from among the extracted dust pixels, extracting, as pixels that are objects of correction, dust pixels that have not been extracted as lightness-changed pixels and dust pixels in whose vicinities extracted lightness-changed pixels do not exist;

correcting saturation information and lightness information of the extracted pixels by using saturation information and lightness information of neighboring pixels of the extracted pixels; and outputting image information that includes information expressing the corrected pixels;

wherein the extracting dust pixels comprises:

a first pixel extraction process, for each of the pixels, that compares the saturation of a pixel and a first value, which is determined from respective saturations of a first pixel group that first predetermined number thereof, determines whether or not the saturation of the pixel is separated from the first value by greater than or equal to a threshold value, and extracts the pixel as a first pixel when the determination is affirmative;

a second pixel extraction process that extracts, from among pixels aligned sequentially from a pixel that is adjacent to the first pixel extracted by the first pixel extraction section, a second pixel that has a saturation which is not separated from the first value by greater than or equal to a threshold value and that is positioned nearest to the first pixel; and a saturation-changed pixel extraction process that, when a number of intermediate pixels existing between the first pixel and the second pixel is less than or equal to a second predetermined number, extracts the first pixel and the intermediate pixels as saturation-changed pixels, wherein, when the lightness of a saturation-chanted pixel, which is extracted by the saturation-changed pixel extraction process, is not darker than the lightness of one of two adjacent pixels and the lightness of the second pixel, the saturation-changed pixel is extracted as a dust pixel.

13. A computer readable medium storing a program that causes a computer to function as respective sections comprising the image processing device according to claim 1.

* * * * *